INVENTORS
MELVIN F. SANKOVICH,
JOHN F. MUMM, DONALD
C. NORTH, JR., HARVEY R.
ROCK, DONALD K. ESTSON

May 2, 1961  M. F. SANKOVICH ET AL  2,982,713
MERCHANT MARINE SHIP REACTOR
Filed Jan. 29, 1959  9 Sheets-Sheet 2

INVENTORS
MELVIN F. SANKOVICH
JOHN F. MUMM, DONALD C.
NORTH, JR., HARVEY R.
ROCK, DONALD K. GESTSON
BY

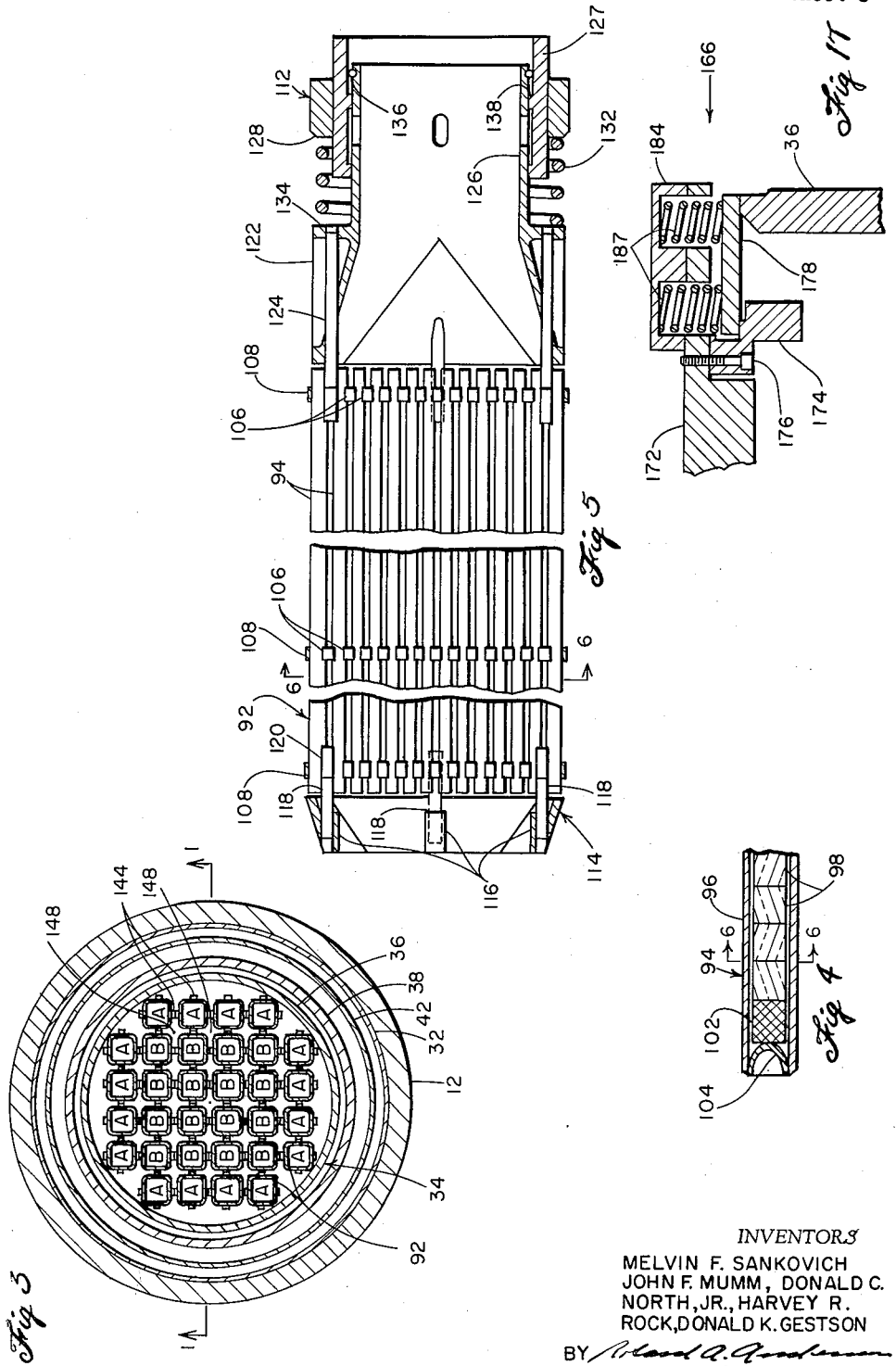

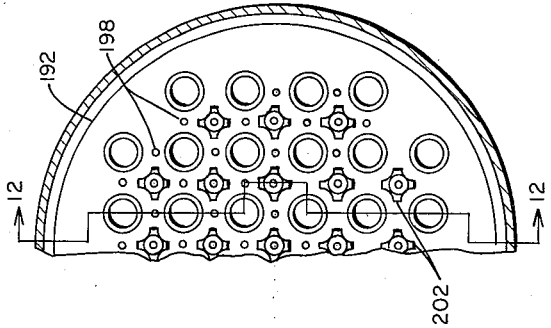
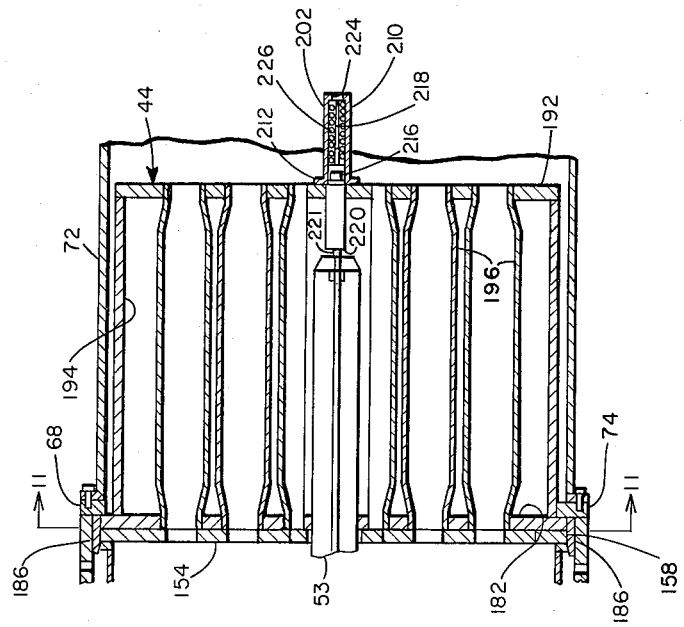
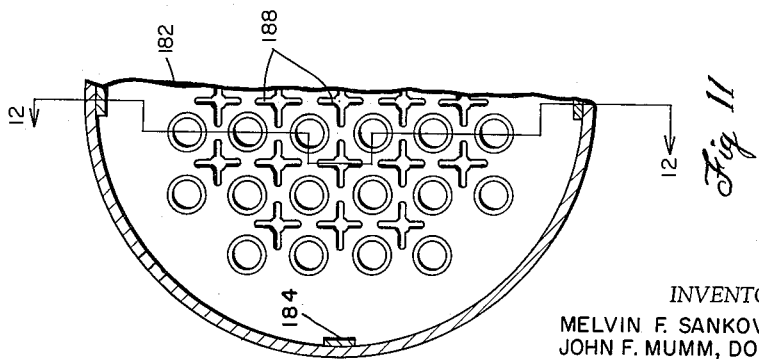

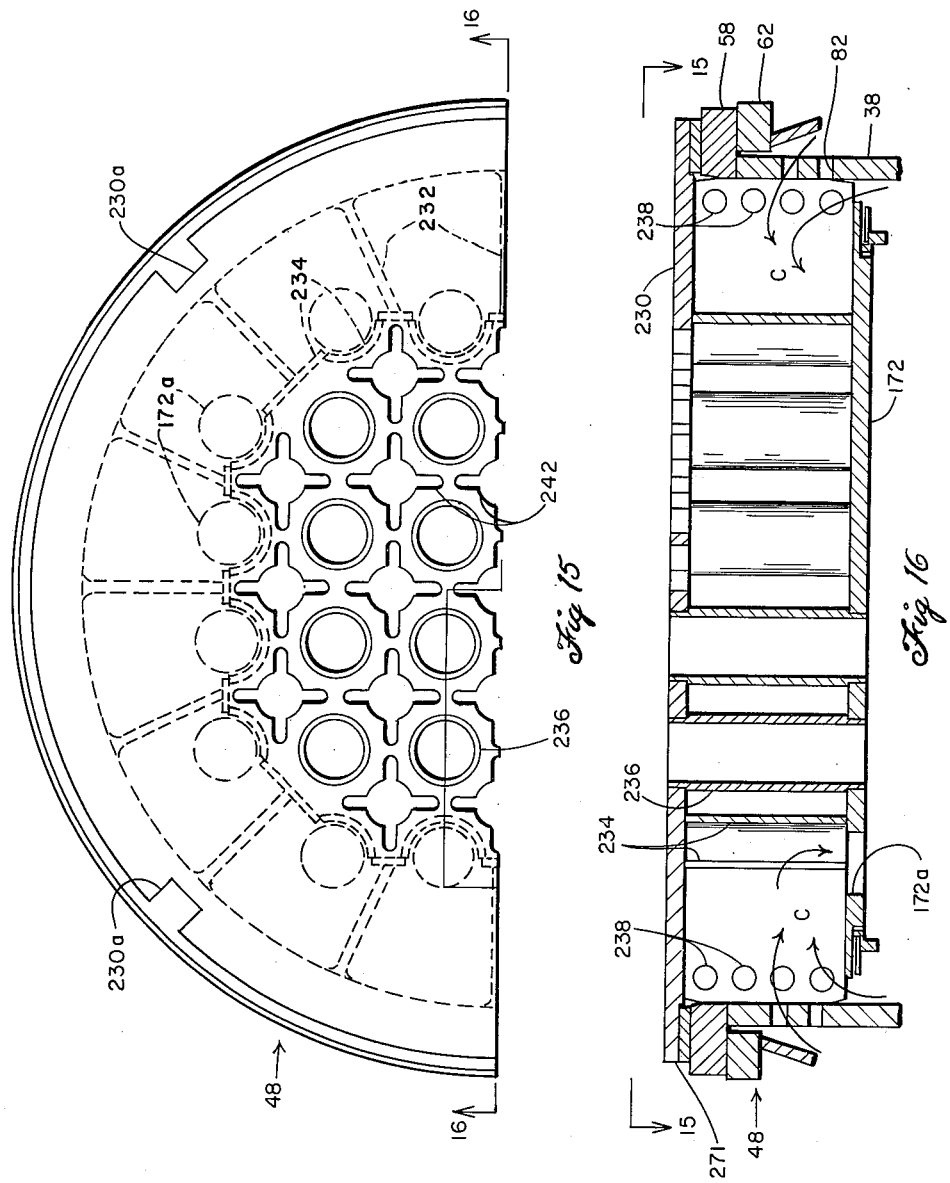

INVENTORS
MELVIN F. SANKOVICH
JOHN F. MUMM, DONALD C.
NORTH, JR., HARVEY R.
ROCK, DONALD K. GESTSON

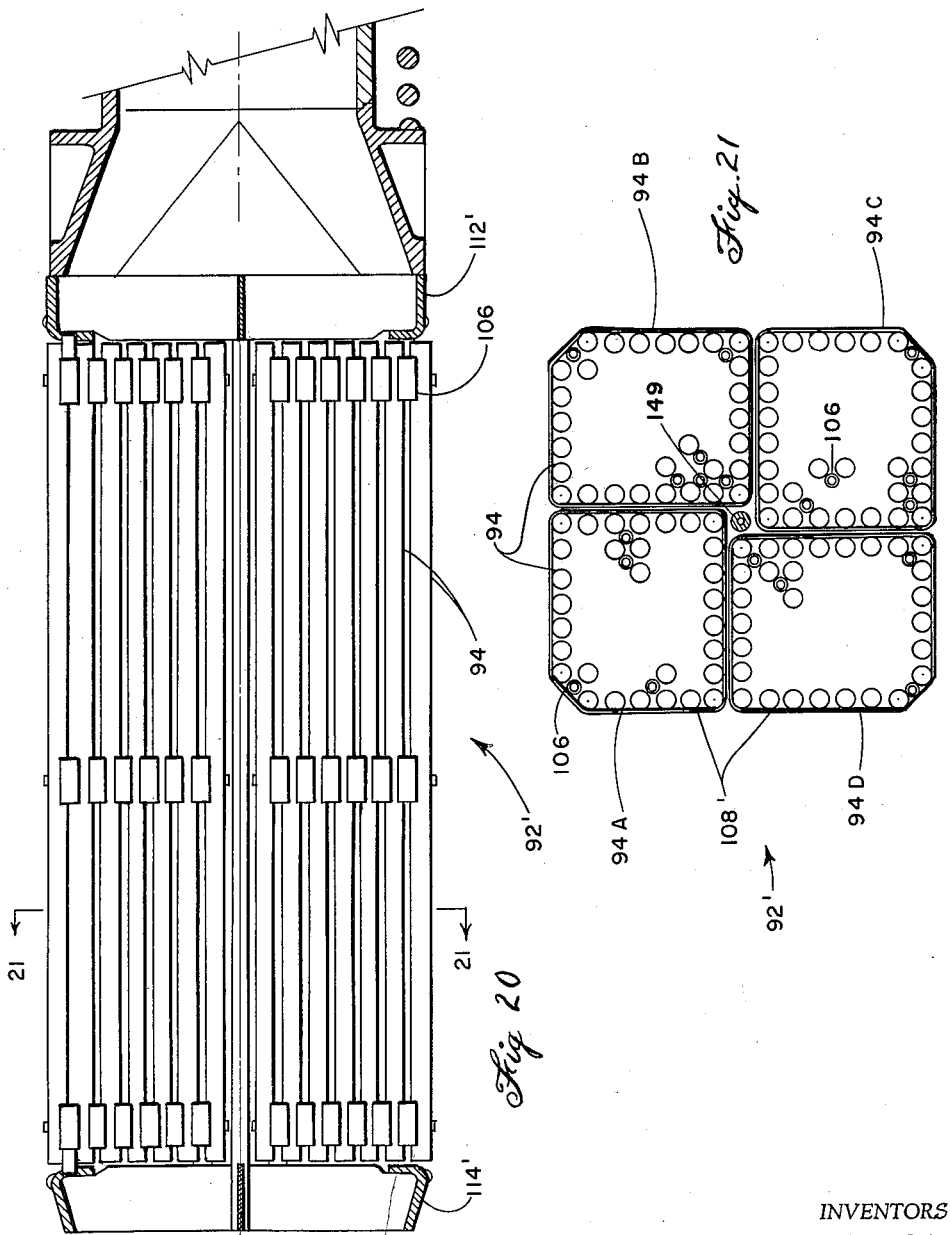

United States Patent Office 2,982,713
Patented May 2, 1961

2,982,713

MERCHANT MARINE SHIP REACTOR

Melvin F. Sankovich, Arlington, Mass., and John F. Mumm, Donald C. North, Jr., Harvey R. Rock, and Donald K. Gestson, Lynchburg, Va., assignors to the United States of America as represented by the United States Atomic Energy Commission Filed Jan. 29, 1959, Ser. No. 790,029

6 Claims. (Cl. 204—193.2)

The present invention relates to nuclear reactors, and more particularly to pressurized water nuclear reactors for use in merchant marine vessels.

A nuclear reactor in a vessel power plant should be small and compact and have a life of sufficient length to make its use economical. Furthermore, the reactor should be constructed to permit ease of assembly and disassembly under unfavorable conditions, and because of the limitations of space, it should have large margins of safety against operational mishaps.

The reactor of this invention is of the type known as pressurized light water moderated and cooled, and obtains its compact construction by an improved utilization of the light water coolant in a novel multi-pass core design which heretofore had been considered undesirable because flow reversal with resultant stream formation and burnout would exist if high power density, large gradients in power density, and low pressure drop should occur simultaneously.

The core of the reactor has a reactivity lifetime conservatively estimated at 52,275 megawatt days of operation. With the appropriate load factor for a passenger-cargo vessel of the class in which the reactor plant is to be installed, this lifetime corresponds to 3⅓ calendar years of operation or more than 355,000 nautical miles without refueling. In order to attain this long life, a large, low power density core is used as will be hereinafter described.

The active core of the reactor is approximately a right circular cylinder made up of elongated fuel elements, square in cross section. The fuel elements are confined within a removable "egg-crate" type lattice to provide the equivalent of a pressure can around each of the fuel elements which are arranged in a square lattice. The "cans" have a wall designed to withstand the pressure differentials which arise as a result of the multi-pass flow pattern. Reactivity control is provided by cruciform-shaped control rods.

The egg-crate lattice containing the fuel elements is confined between a lower flow baffle and an upper grid plate, the latter serving also as part of structure providing a turn-around manifold from which the entire primary coolant flow is distributed into the outer fuel elements from outside the core where the coolant makes its "first pass." (This reactor is referred to as a three-pass design because the coolant crosses the horizontal midplace of the vessel three times.)

Guide tubes below the lower grid plate serve as an extension of the fuel element cans, directing the downflowing coolant from the outer or second pass elements into the lower plenum region where final distribution of the flow takes place. The guide tubes also serve to prevent cross flow and the accompanying lateral thrust against the control rod extensions.

From the lower plenum, most of the total primary coolant flows into the inner guide tubes which serve as a hydraulic entrance section prior to the entry into the inner or third pass fuel elements. A small amount of the total coolant flow passes into the control rod channels and the reflector region.

Guide tubes above the core conduct the coolant streams directly to the upper plenum of the vessel and, at the same time, prevent cross flow and lateral thrust against the control rods in the "out" position. The coolant streams mix in the upper plenum, make a full 180° change of direction, and flow downwardly to the exit nozzles.

The multi-pass arrangement which has been provided and will be later more particularly described has several advantages over a single pass arrangement, and some of these advantages are:

(a) There is improved utilization of the coolant by virtue of the fact that the fluid flows in succession through the regions of low, intermediate, and high heat generation;

(b) The primary coolant flow rate for the multi-pass system is approximately one-half that of a single pass design, since for a specified operating pressure, the flow velocity over the fuel rod surface must exceed some minimum value to satisfy heat transfer requirements. Also, it can be shown that under the additional constraints imposed by economic piping design, the total plant pumping power is less for a multi-pass system than for a single pass core.

As already noted, the use of downflow in a fuel region had been heretofore considered a major objection to the use of a multi-pass core design. However, analysis of the present multi-pass design shows that spontaneous flow reversal will not result even when only a single pump is running at half speed and a factor of two in power density exists between any two fuel elements in the second pass. This conclusion applies for the worst combination of pitch and roll of the ship. Should all pumps fail, the reactor is scrammed, and during decay heat removal by emergency cooling, the heat generation rates are too low to cause burnout even if flow reversal should occur.

The thermal design parameters for the reactor of this invention are summarized in Table 1 below:

Table 1

| | |
|---|---|
| Design power | 74 mw, heat. |
| Flow rate | $8.0 \times 10^6$ lb./hour. |
| Operating pressure | 1750 p.s.i.a |
| Inlet temperature | 494.8 F. |
| Temperature rise | 26.6 F. |
| Average heat flux | 66,850 B.t.u./hr.-ft.$^2$ |
| Pressure drop, nozzle to nozzle | 21 p.s.i. |

A complete discussion of the reactor physics involved in the design of the reactor internals is found in the paper "Reactor Physics and Core Design of the Merchant Ship Reactor" presented at the Nulear Engineering and Science Conference, March 17 to 21, 1958, published by the American Institute of Chemical Engineers.

It is, therefore, a first object of this invention to provide a compact and extended life nuclear reactor utilizing a rangement.

It is a further object of the present invention to provide a compact and extended life nuclear reactor utilizing a multi-pass core design.

A further object of this invention is a pressurized water reactor providing for downflow of the coolant in a fuel region.

Other objects and purposes of this invention will become more readily apparent from the following description of the invention taken with the illustrative embodiment shown in the drawings in which:

Figure 3 is a horizontal section through the reactor taken along 3—3 of Figure 1;

Figure 4 is a greatly enlarged section of a fuel rod;

Figure 5 is an enlarged vertical section of one type of fuel element assembly;

Figure 11 is a plan view of the lower plenum baffle assembly taken along the line 11—11 of Figure 12;

Figure 12 is a vertical section of the lower plenum baffle assembly taken along the lines 12—12 of Figures 11 and 13;

Figure 13 is a bottom horizontal view of the lower plenum baffle assembly shown in Figure 12;

Figure 15 is a plan view of the upper grid plate assembly taken along the line 15—15 of Figure 16;

Figure 16 is a vertical section of the upper grid plate assembly taken along the line 16—16 of Figure 15;

Figure 17 is a detail section of the washer-type seal which seals off the inner thermal shield cavity from main coolant flow;

Figures 18, 19:
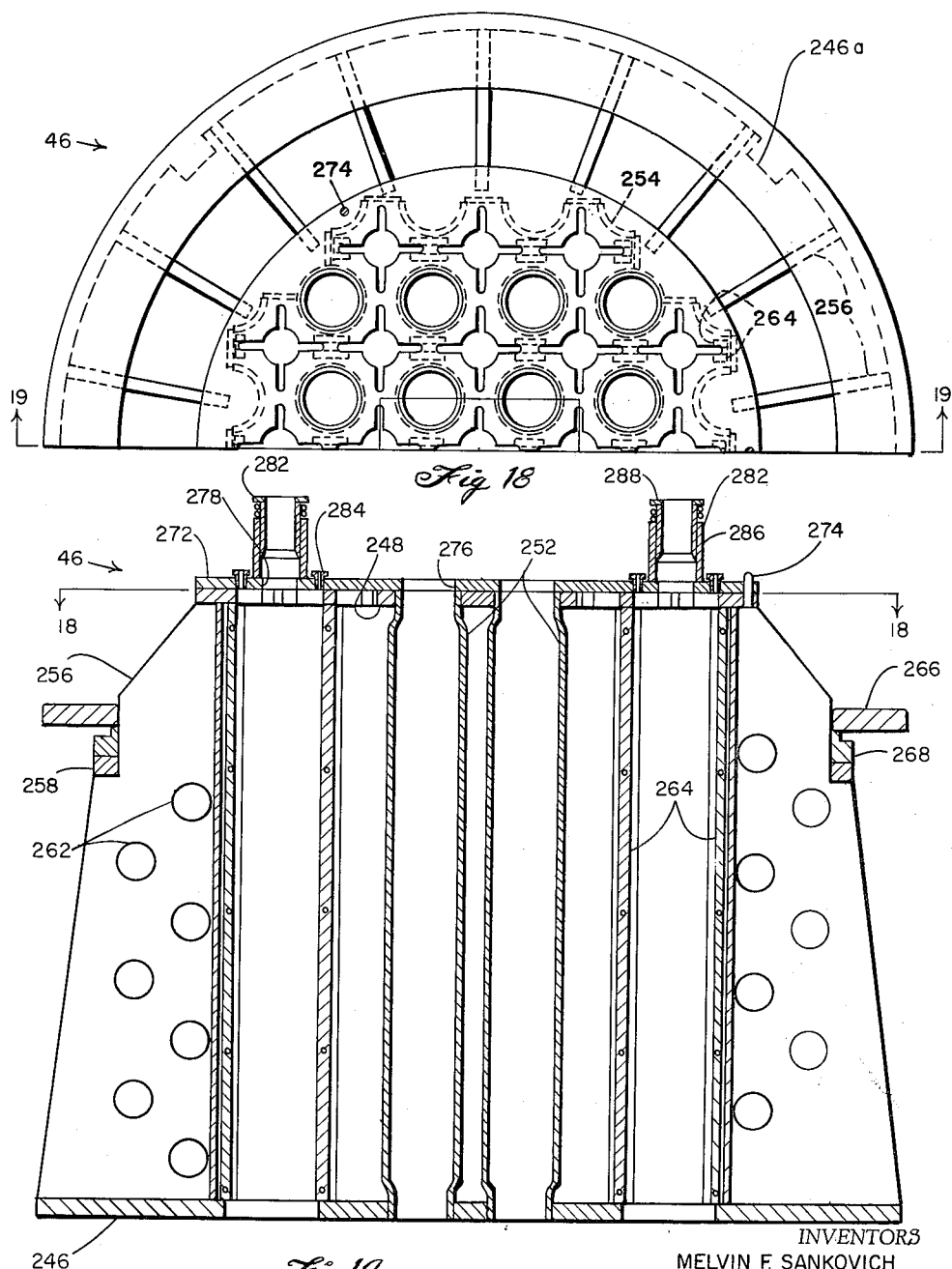
Figure 18 is a plan view of the upper plenum baffle assembly taken along the line 18—18 of Figure 19.

Figure 19 is a vertical section of the upper plenum baffle assembly taken along the line 19—19 of Figure 18; and Figures 20 and 21 are elevation and section views along 21—21 of a fuel assembly of alternate construction.

Figure 1:
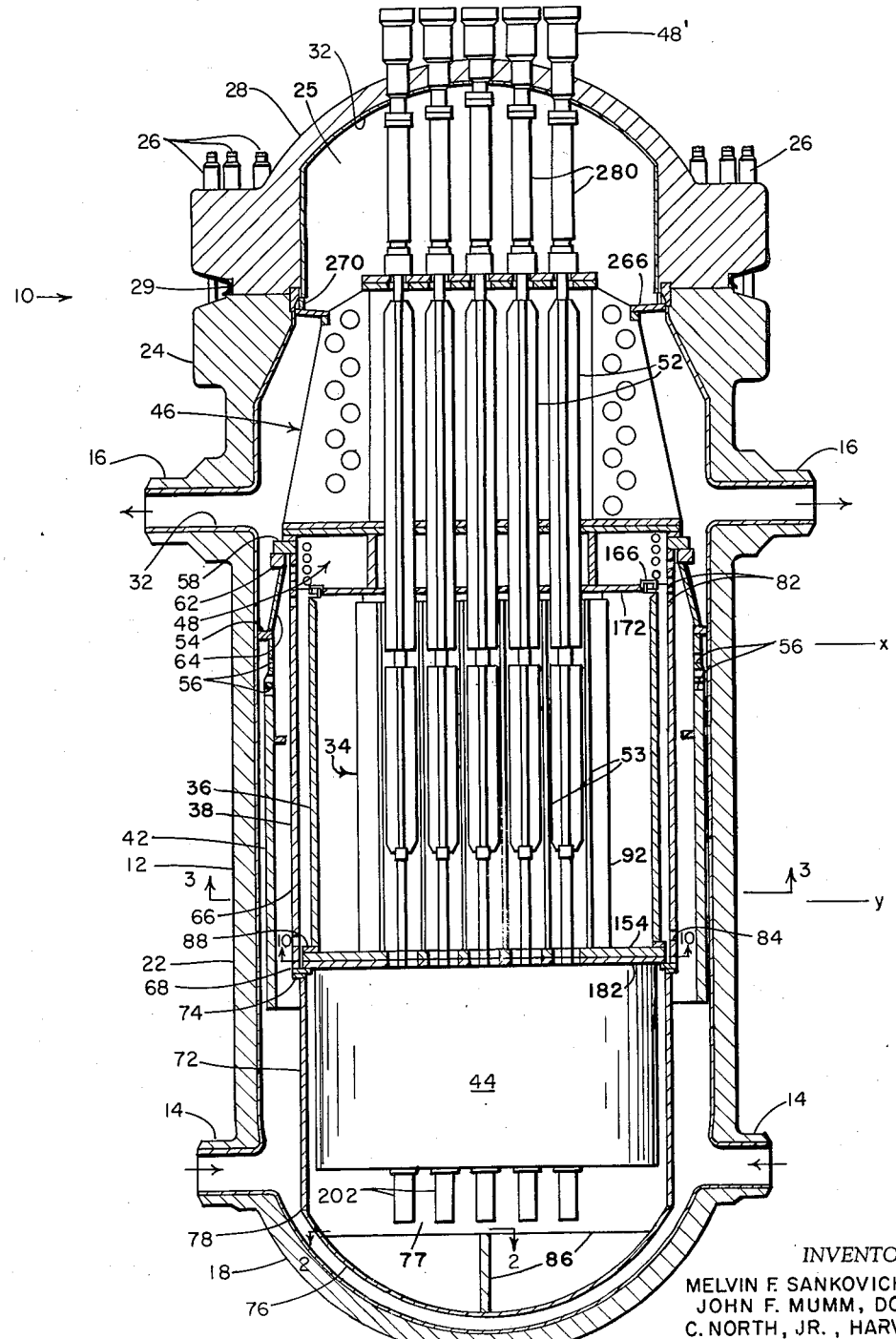
Figure 1 is a vertical section through the reactor of the invention showing the internals schematically and partially in section.

Referring to Figure 1 of the drawings, reactor 10 of this invention is composed of a vertically elongated pressure vessel 12 of circular cross section provided at its lower end with two primary coolant inlet nozzles 14 and two outlet coolant nozzles 16 at its upper end. Vessel 12 has a hemispherically shaped bottom 18 and a cylindrical wall 22 which flares at its upper end to form an upper closure flange 24. A plurality of threaded studs 26 are arranged to connect a hemispherically shaped closure 28 to flange 24 to form a pressure tight joint and an upper plenum 25. An omega seal 29 welded across closure 28 and flange 24 insures a leak proof joint. Vessel 12, including closure 28, is formed of carbon steel with a stainless steel cladding 32 fixed to their inner faces.

Within vessel 12 are mounted the active core 34, shielding 36, 38 and 42 surrounding core 34, a lower plenum baffle assembly 44, an upper flow baffle assembly 46 shown schematically, and an upper grid plate assembly 48, also schematically illustrated, sandwiched between core 34 and assembly 46.

Also shown in Figure 1 are a plurality of nozzles 48' to which are attached lifting mechanisms (not shown) extending into reactor 10 through closure 28 containing apparatus (not shown) to support and control the movements of control rods 52 which extend into core 34 as shown and which will be later more particularly described. The lifting mechanisms (not shown), forming no part of this invention, may comprise the usual electric motors and associated gearing arranged in accordance with the general design principles given in Nucleonics, Vol. 13, No. 6, June 1955, pp. 48–51.

Figure 2:
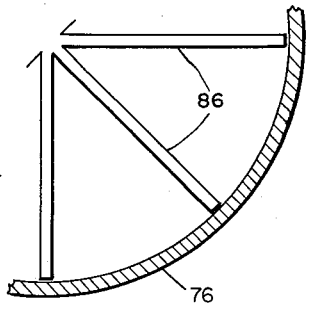
Figure 2 is a view of the lower plenum baffle arrangement taken along 2—2 of Figure 1.

The interior of reactor vessel 12 is arranged and constructed to permit three flow passes of the primary coolant or moderator liquid light water as will be hereinafter described. Outer thermal shield 42 is a vertically extending stainless steel wall forming a right circular cylinder open at the bottom and permanently attached at its top by convenient means to a main internals support ring 54 which is welded to the inside of wall 22 as illustrated. Outer thermal shield 42 extends above and below a pair of spaced imaginary horizontal planes $x$ and $y$ which define the upper and lower limits, respectively, of the active fuel region of core 34. Shield 42 is provided with orifices 56 adjacent the top thereof to permit flow of liquid therethrough as will be later more fully explained. Middle thermal shield 38 is generally of cylindrical construction and has a flange 58 welded to its top edge. Shield 38 is attached in reactor vessel 12 by having its flange 58 bolted to a core support ring 62 which is welded to the top edge of a frustro-conically shaped support skirt 64 which is, in turn, welded at its bottom to the main internals support ring 54, as illustrated. Middle thermal shield 38 is comprised of three sections, an upper vertically extending stainless steel right circular cylinder 66 having a welded flange 68 at the bottom thereof, a central stainless steel right circular cylinder 72 with a welded flange 74 contiguous with flange 68, and a bottom ellipsoidal section 76 welded at its rim 78 to central cylinder 72. Flanges 68 and 74 are bolted together by a plurality of bolts (not shown) so as to join shield sections 66 and 72 together. Bottom ellipsoidal section 76 of shield 38 acts to close off the interior of shield 38 or lower plenum 77 from the first pass of the primary coolant which enters nozzles 14 and flows up the outside of shield 38, as will later be more fully described. Upper cylinder 66 of shield 38 is provided with orifices 82 and 84 at the top and bottom respectively to permit passage therethrough of primary coolant liquid. In plenum 77 formed by section 76 of shield 38, there may be utilized, if needed, a star-shaped flow baffle 86, as more particularly shown in Figure 2, to direct and uniformly distribute coolant flowing down from the second pass fuel elements up into the third pass fuel elements, as will be later more fully described.

Inner thermal shield 36 is a vertically extending stainless steel, open ended right circular cylinder having a flange 88 welded at the bottom thereof. Shield 36 forms the outer wall of reactor core 34 and is bolted at its bottom through flange 88 and sealed at its top as will be later more particularly described, and is bolted to a base plate 154 to form an integral part of the "egg crate" assembly.

As best seen in Figure 3, reactor core 34 consists of 32-spaced, elongated, longitudinally contiguous, square-shaped, fuel-containing assemblies 92 geometrically arranged in an "egg-crate" type lattice to undergo a controlled chain-type fission reaction. The designation of "A" and "B" assemblies indicates the direction or "passes" of coolant flow. The "A" assemblies are those in which the coolant flows downward in its second pass through the reactor, and the "B" assemblies are those in which the coolant flows upwardly in its third pass.

Making reference to Figures 4, 5, 6 and 7 for the details of one type of fuel assembly 92, which may be used in core 34, it will be seen that each assembly 92 is comprised of a plurality of cylindrically shaped fuel rods 94 arranged parallel to the vertical axis of reactor 10. As seen in Figure 4, each fuel rod 94 is a cylindrically shaped stainless steel tube 96 having an outside diameter of 0.50 inch and 0.035 wall thickness and a stainless steel end closure is welded into each end, as to be now described. Arranged therein is a column of cylindrically shaped fuel pellets 98 stacked end to end. Fuel pellets 98 are low enrichment uranium oxide ($UO_2$) which has been compressed and sintered to yield a high density and a close dimensional tolerance. As is now understood in the art, an enriched uranium oxide is one in which the abundance of the $U^{235}$ isotope is increased above the amount normally contained therein. The enrichment of this particular fuel element is to 4.2 percent $U^{235}$ by weight for the "B" assemblies, 4.6 percent for the "A" assemblies. Fuel pellets 98 have a diameter of approximately 0.4245 inch and a length-to-diameter ratio of approximately one. The diameter of fuel pellets 98 is sufficiently smaller than the interior diameter of fuel rod tube 96 to provide an annular space between tube 96 and pellets 98. An insulating spacer 102 is placed at each end of the fuel pellet column. Each fuel rod 94 terminates at both ends in dished caps 104 with a wall thickness of 0.035 inch which are lip welded at each end of the fuel rod tubes 96 with the dished portion facing the insulating pellet 102 forming a seal therefor. Insulating pellet 102 serves to reduce the temperature gradient between tube 96 and the end fuel plug, thereby reducing the stresses caused by differential thermal expansion. The distance between the interior faces of dishes 104 within tube 96 is initially greater than the height of the column of pellets 98, 102 to allow for the assembly and differential expansion of the pellets. A heat transfer medium, such as helium, is placed within tube 94 to fill the voids and reduce the temperature gradient across the voids.

Figure 6:
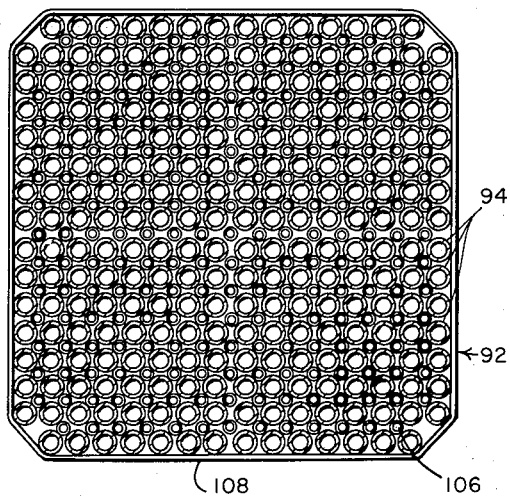
Figure 6 is a horizontal section of the fuel element assembly taken along the lines 6—6 of Figure 4 and 5.

Each fuel element assembly 92, as shown in Figures 5 and 6, is composed of fuel rods 94 arranged in square lattice. Fuel rods 94 are separated from each other by hollow ferrules 106 integrally attached to the fuel rods 94 by brazing or resistance welds. Seven planes or rows of support planes, each containing ferrules, are spaced along the length of the fuel element assembly 92. A strap 108 is wrapped around each fuel element assembly 92 and is brazed to each of the outer fuel rods 94 at each ferrule plane to help support fuel assembly 92 during fabrication and prevent contact between the outer fuel rods. A fuel element wall or can 110, illustrated in Figure 8 and to be described below, surrounds and is part of each fuel element assembly 92.

For mounting fuel assemblies 92 in reactor core 34, and to permit flow of coolant through and around assemblies 92, each of the latter is provided with an upper and lower piece 112 and 114, respectively, as shown in Figure 5. At the bottom of each element assembly 92, piece 114 has four shoulders 116 with holes for supporting rods 118 which are welded therein at one end. At the opposite ends of bolts 118, the latter are threaded and boltably attached to the interior of the four corner elongated ferrules 120 of the lower ferrule plane. Piece 114 is shaped to have a hollow interior cross section. At the upper end of assembly 92, transition piece 112 provides a hold down against the hydraulic forces of the flowing fluid and allows for differential expansion between the fuel rods 92 and the grid plates to be later described.

Figure 8:
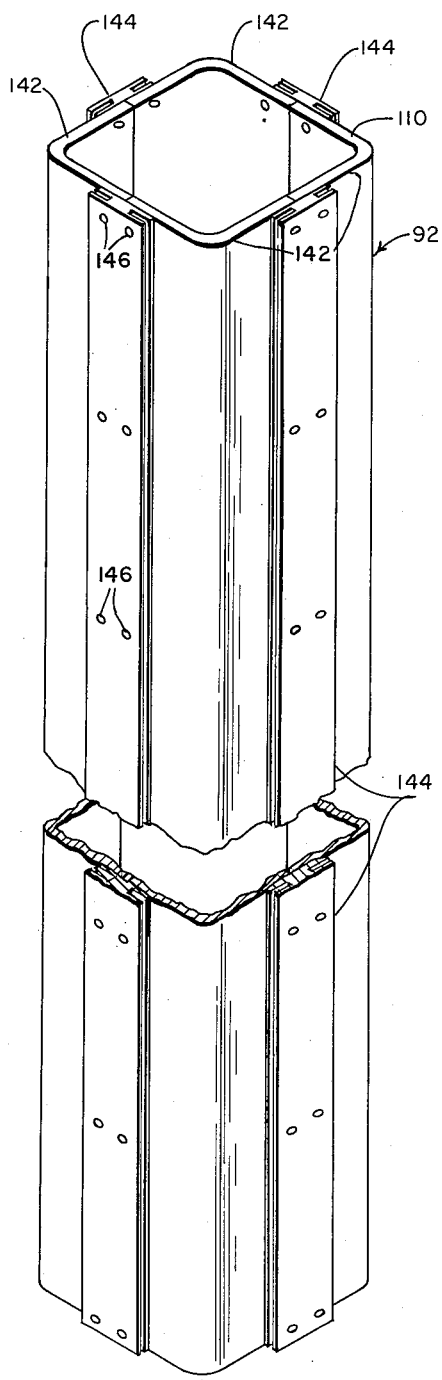
Figure 8 is an isometric view of a fuel element can.

Each fuel element assembly 92, as described above, is contained in a can 110 approximately square in cross section, as more particularly shown in Figure 8. Each fuel element can 110 is fabricated from four elongated angles 142 approximately 4" x 4" and 7'6" in length joined at the center of each side by a flow blocking strip 144 extending the full length of cans 110. The thickness of cans 110 are 0.094" for "B" assemblies and 0.109" for "A" assemblies. Each flow blocking strip 144 is joined by rivets 146 across adjacent angles 142 and together with adjoining angles in such a manner as to build up the cans in an integral "egg-crate" structure. Also, it will be noted that strips 144 with assemblies 92 form cruciform channels 148 for control rods 52, and thereby act as flow blockers to insure controlled flow to each control rod channel 148.

An alternate preferred fuel assembly configuration is shown schematically in Figures 20 and 21. Fuel rods 94 and spacing ferrules 106 are arranged in four separate bundles 94A, 94B, 94C and 94D with a center hollow shaft 149 as illustrated. Straps 108' in similar fashion form the bundles which are combined in convenient fashion into the fuel assembly 92'. Lower and upper adapters 114' and 112', respectively, which may be segmented as shown, are provided to complete the assembly before inserting into cans 110. The exact configuration of the fuel elements within can 110 do not form a part of this invention.

Figure 14:
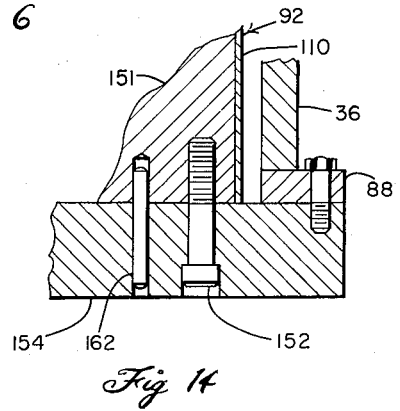
Figure 14 is a section along 14—14 of Figure 10 showing one bottom corner of the reactive core aligned and joined to the lower grid plate.
Figure 7:
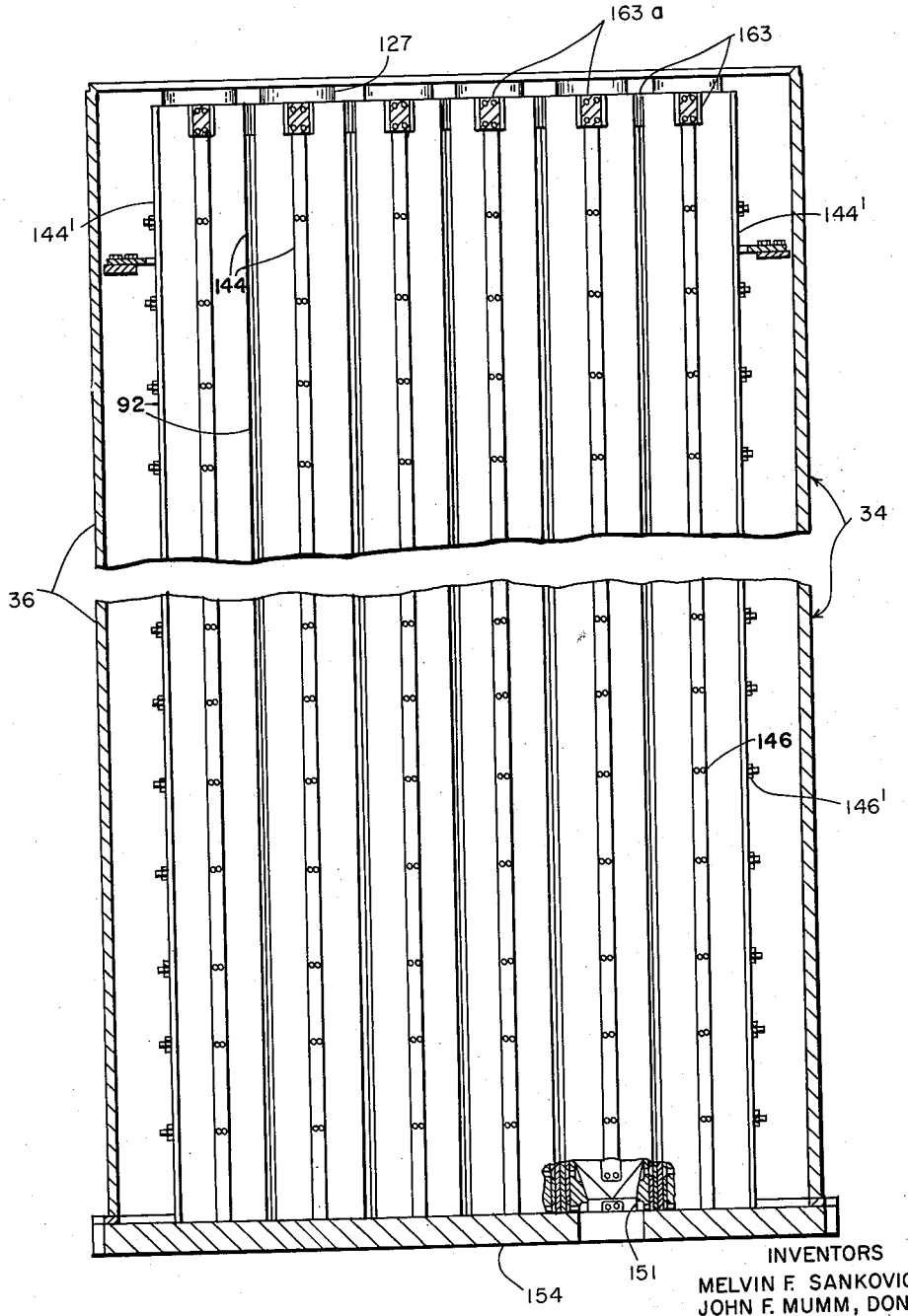
Figure 7 is an enlarged vertical section of the reactive core similar to that shown in Figure 1 utilizing fuel element assemblies as shown in Figure 5.
Figure 10:
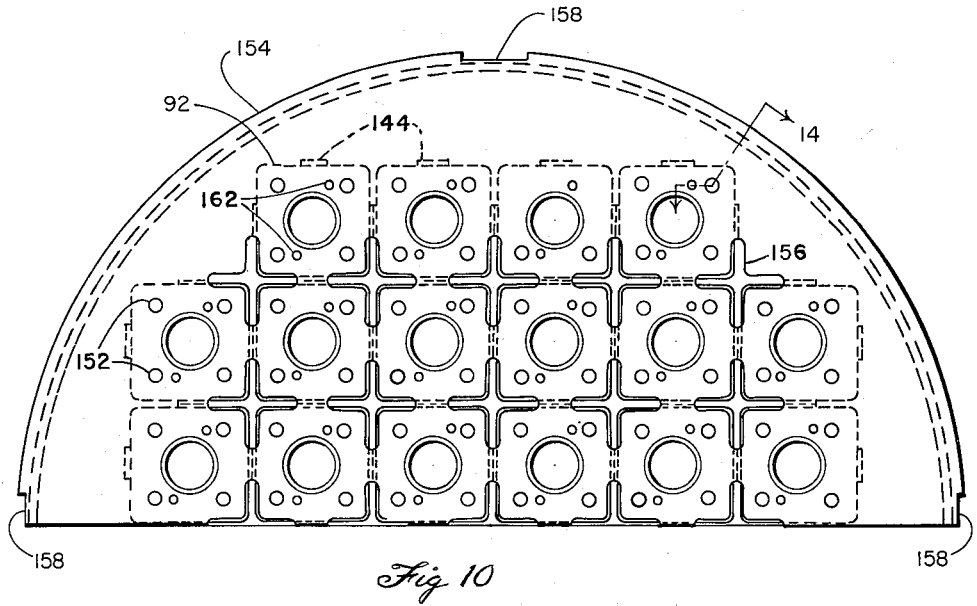
Figure 10 is a bottom view of the reactive core shown in Figure 7.
Figure 9:
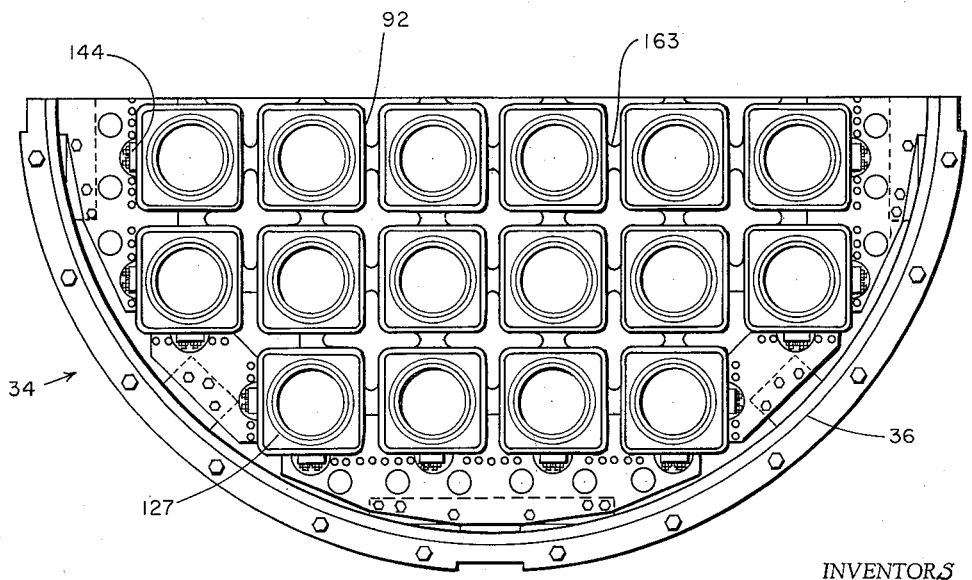
Figure 9 is a plan view of the reactive core shown in Figure 7.

For the details of how fuel assemblies 92 are mounted to form the reactive portion of core 34, reference is made to Figures 7, 10 and 14 where it is shown that fuel assemblies 92 are supported on the bottom by a base plate 154. For this purpose there are provided lower transition pieces 151 which are attached by bolts 152 to grid plate 154 which has a plurality of cruciform openings 156 which line up with fuel rod channels 148 between fuel assemblies 92. Transition pieces 151 are bolted to cans 110 which with strips 144 extend down to the top surface of grid plate 154. Plate 154 is provided with four notches 158 to be aligned with lugs (not shown) mounted on core support shield assembly 44 to facilitate orientation of core 34 during assembly thereof. Also, a pair of aligning pins 162, shown in Figure 14, extending through plate 154 and into each transition piece 151 are provided by force fit to insure proper aligning of fuel assemblies 92 during fabrication thereof. The tops of fuel assemblies cans 110 terminate below the top edge of shield 36 with slidable extensions 127 of top pieces 112 extending thereabove. In the outside blocking strips 144', rivets 146 are finished off with nuts 146'.

A washer-type annular seal ring 166, shown schematically in Figure 1, is more particularly shown in Figure 17 and is utilized to provide sealing of the interior of core 34 between the top edge of cylindrical thermal shield 36 and the outer periphery of the lower plate 172 of the upper grid plate assembly 48. For this purpose there is provided a retainer ring 174 attached by bolts 176 to the outer periphery of plate 172 and a flat annular sealing ring 178 seated on shield 36 and retainer ring 174. To provide positive sealing of seal ring 178, the latter is held down by a pair of coil springs 187 located at twenty positions around the circumference of ring 178 supported within housings 184 welded at one end for support to plate 172.

The base plate 154 of reactive core 34, shown in Figure 1, rests upon upper plate 182 of lower plenum chamber baffle assembly 44. Plates 154 and 182 are keyed to each other and in turn are keyed to flange 68 of the middle thermal shield 38. For this purpose, as illustrated in Figures 10, 11 and 12, plates 154 and 182 are slotted in four places at 158 and 184, respectively, and four keys 186 are attached by bolts (not shown) to the bottom of shield 36 adjacent flange 68. Plate 182 is provided with cruciform shaped penetrations to allow movement therethrough of control rod followers 53 and passage of coolant.

Lower plenum baffle assembly 44, shown more particularly in Figures 11, 12 and 13, is formed by upper plate 182 and lower plate 192 separated by and welded to a right circular cylinder 194 at the outer periphery to form with plates 182 and 192 a rigid structure. Fuel element guide tubes 196 are located at each fuel element position to provide continuous passage to the interior of fuel assemblies 92. The lower surface of plate 192 provides a mounting surface for control rod emergency snubbers 202 which are spring and piston arrangements to prevent damage to control rods 52 and followers 53 in the event that the rods are accidentally dropped during handling operations. Lower plenum baffle assembly 44 structurally supports core 34.

Each emergency snubbing mechanism 202, illustrated in Figures 12 and 13, consists of a hollow cylinder 210 having a flange 212 mounted on plate 192 by a plurality of bolts (not shown) through appropriate openings in the former. A central opening in plate 192 for each snubbing mechanism 202 permits a piston 216 to be mounted slidably within cylinder 210. One end 220 of piston 216 bears the impact of an extension 221 extending from the bottom of follower 53. Hydraulic snubbing is accomplished through opening 224 in the free end of cylinder 210 in conjunction with a spring 226, which also provides repositioning for piston 216 after shock loading.

Upper grid plate assembly 48, which is located immediately above reactive core 34, is more particularly shown in Figures 15 and 16. Assembly 48 is fabricated of two parallel plates 172, previously described, and 230 which are separated by 16 radially directed ribs 232, a flow separating baffle 234, and cylinders 236. Ribs 232 are either cut or drilled through with openings 238 to permit uniform distribution of the coolant to the second pass fuel elements as will later be described. Flow baffle 234 is irregularly shaped, continuous, having semi-circular and flat-shaped sections welded together as illustrated, dividing the coolant between the outer "A" fuel assemblies 92 and the inner "B" fuel assemblies 92. As will be more fully explained later, the outside of baffle 234 (between ribs 232) serves as a turning chamber to reverse the flow from thermal shields 36, 38 and 42 comprising the first pass through the reactor into the second pass or outer fuel elements 92, as indicated by arrows C in Figure 16. The 16 cylindrical tubes 236, approximately 8 inches in diameter with ends reduced to approximately 5.5 inches in diameter by a swaging process, are located within baffle 234. Each tube 236 is at a fuel element location and serves to pass upwardly to assembly 46 coolant egressing from the fuel assemblies 92. Tubes 236 are weldably attached to the upper and lower plates 172 and 230 and also act as support columns therefor. Cruciform penetrations 242 in plate 230 between the openings for tubes 236, as illustrated in Figure 15, are provided in both the upper and lower plates 230 and 172 of the upper grid plate assembly 48 for control rod movement and for control rod channel coolant flow.

As best seen in Figures 18 and 19, upper flow baffle assembly 46 which provides space into which cruciform control rods 52 are withdrawn, consists of a pair of plates 246 and 248 separated by 16 flow guide tubes 252, a circular shaped shroud 254 encompassing guide tubes 252 and control rod channels, and 18 radially disposed ribs 256.

Flow guide tubes 252 are right circular cylinders weldably attached to the upper and lower plates 284 and 246 of this assembly and are aligned with tubes 236 in assembly 48 leading into the interior of fuel assemblies 92 in core 34. Radial ribs 256 are strength members and act as supports for a spring support ring 258 and are also perforated with openings 262 to assure good flow distribution. A plurality of grooved bars 264, 2.5 inches by 3 inches, extend the distance between the upper and lower plates 248 and 246 and are bolted to these plates. There are two such bars 264 provided for each control rod 52 and act as guides therefor.

In order to insure that core 34 and the internals of reactor 10 are held down against the upward thrust of the coolant flow, there is located nine inches below, and parallel to upper plate 248, the spring support ring 258 referred to above which is supported by the ribs 256 of assembly 46. Flat plate ring spring 266 creates a hold-down load which is transmitted to support ring 258 through an intermediate ring 268. Spring 266 is approximately 72 inches I.D. by 87 inches O.D. by two inches thick. The load from vessel closure 28 is transmitted to spring 266 through an intermediate or head loading ring 270, shown in Figure 1, which is attached to closure 28 in convenient and usual fashion, such as by the use of bolts (not shown). To insure proper alignment of upper grid plate assembly 48 with upper flow baffle assembly 46 during fabrication, four slots 230a are provided in plate 230 to match slots 246a in plate 246 and those (not shown) in an annular ring 271 to accommodate keys (not shown) for this purpose.

A control nozzle seal plate 272 rests upon and is supported by upper plate 248 of upper plenum baffle assembly 46 and is positioned by means of three vertical locating dowels 274. Openings 276 for primary coolant flow out of the fuel element guide tubes 252 and openings 278 for control rod extensions 280 (shown in Figure 1) are provided in seal plate 272. Orifice plugs 284 to permit the flow of coolant from control rod channels 148 are also provided in plate 272. Closure sealing to control rod nozzle seal plate 272 is obtained through 21 inner cylinders bolted to 21 flanges in closure head 28. An outer riding cylinder is pressed against the seal plate through a spring mounted on the outside diameter of the inner cylinder to maintain a seal for primary coolant leakage and to take up relative thermal expansion between the vessel and the internals. For convenience only, two nozzle seals 282 with plugs 284 are illustrated in Figure 19, although it is understood there is a seal 282 with plugs for each control rod position.

Control rods 52 are of cruciform cross section and are movably positioned within control rod channels 66 formed by the fuel element cans 110 and flow blocking strips 144. Control rods 52 are formed of four equal width arms disposed at right angles to each other. The overall width of each control rod is 8 inches with a thickness of 3/8 inch and an active length of approximately 66 inches. The control rods as set forth are formed of materials having a high neutron absorption cross section, as is understood in the art. The core contains a total of twenty-one control rods. Control rods 52 are positioned vertically within the core by means of connection rods which extend through closure 37 and would be attached to a suitable control rod drive mechanism external to the reactor 20. One such suitable control rod drive mechanism is described in U.S. Patent No. 2,841,018, issued July 1, 1958, to J. J. Dickson. A control rod drive shaft would pass through each control rod adapter 282 and closure 28 of reactor 10 and would be connected to the control rod 52 which would be in turn connected to a control rod follower 53. Control rod followers 53 have substantially the same physical arrangement as control rods 52 but are made of Zircaloy-2, a low neutron absorption material. As a control rod 52 is withdrawn from the core, it travels upwardly into upper plenum chamber 25, and its position within the core is taken by the control rod follower 53. Control rod follower 53 is provided to prevent the formation of large coolant flow spaces through the core when control rods 52 are withdrawn. The control rod drive mechanism, described above, is a fail safe type mechanism so that if there is a failure of the control rod drive mechanism system, the control rod 52 will fall into the core and scram the reactor.

The flow of primary coolant through the reactor shown in Figures 1 through 19 is as follows: All of the light water coolant enters reactor vessel 12 through inlet nozzles 14 and flows upward for the first pass in the channels between shield 36 and pressure vessel wall 22 formed with shields 38 and 42 adjacent openings 56 and passes into the outer part of assembly 48 through openings 82 in shield 38 where the coolant recombines with the coolant from the channel between shields 36 and 38. The coolant then passes through openings 172a of plate 172 down into the "A" fuel assemblies 92 to make its second pass through reactor 10. At the bottom of core 34, the coolant passes into the outer tubes 196 of assembly 44 and then egresses below the lower plenum 77. The coolant is reversed in direction 180° by lower plenum chamber 77, and at least 85 percent of the coolant flows into the 16 inner guide tubes 196 leading into the interior of the "B" or third pass fuel assemblies 92. Approximately 9 percent of the total coolant flow passes through openings 198, shown in Figures 12 and 13, in baffle assembly 44 and thence into control rod channels 148. The remaining 6 percent or less of the total coolant flow is accounted for by miscellaneous leakage. The guide tubes 236 in assembly 48 and tubes 252 in assembly 46 conduct the coolant streams directly to upper plenum 25 of vessel 12 located directly beneath closure 28 and at the same time prevent cross flow and lateral thrust against control rods 52 located in assembly 46 during their "out" position. The coolant stream recombines in upper plenum 25 and makes a full 180° change of direction and flows downwardly to the exit nozzles 16 when the coolant leaves reactor vessel 12.

Core 34 and the internals of vessel 12 are held down against the upward thrust of the coolant by the upper baffle hold-down spring 266. The downward force is transmitted to the eight equally spaced vertical struts 256 which bear on the upper grid plate 246. The internals are designed to prevent motion of core 34 under the worst specified conditions of roll, pitch and heave of the ship. The internals are also designed to minimize relative motion of core 34 in the event the ship should capsize and sink.

The start-up of reactor 10 and control thereof under operating conditions are carried out in a conventional manner. Means for accomplishing these steps are well known and form no part of the present invention. For example, a general description of the methods of pile control is found in The Science and Engineering of Nuclear Power, Addison-Wesley Press, 1947, Chapter 8 and in Fermi and Szilard, U.S. Patent No. 2,708,656, columns 51–56. Suitable instruments and components for a reactor control system are listed in Nucleonics, Volume II, No. 6, 1953, pages 35–40. Automatic control of power reactors is described in Nucleonics, Volume 6, No. 2, 1950, pages 58–65. A control system for a high flux pile which is applicable to the reactor of the present invention is described in the co-pending application of Newson, Epler, Cole and Wigner, No. 357,216, although the control rods and some mechanical details of the lifting mechanisms are different. The method of starting a reactor is described in Nucleonics, Volume 6, No. 2, 1950, page 59, and also in Nuclear Engineering, Part I, Chemical Engineering Progress Symposium Series, Volume 50, No. 11, 1954, pages 221, 223.

To further illustrate the preferred embodiment of the invention, the below Table 2 gives the details of the reactor described above:

*Table 2*

| | |
|---|---|
| Design pressure | 2000 p.s.i.a. |
| Core over-all length | 90.25 in. |
| Active fuel length | 66 in. |
| Equivalent core diameter | 62.06 in. |
| Fuel Element Materials: | |
| (a) Fuel | $UO_2$. |
| (b) Cladding | Stainless steel. |
| (c) Ferrules | Do. |
| (d) Springs | Inconel–X. |
| (e) Can | Stainless steel. |
| Fuel pellet diameter | 0.4245 in. nominal. |
| Cladding outside diameter | 0.500 in. nominal. |
| Cladding thickness | 0.035 in. nominal. |
| Fuel elements in core | 32. |
| Fuel element can thickness | 0.094, 0.109. |
| Heat transfer area | 3778 ft.$^2$. |
| Metal to water ratio (homogenized | 0.76. |
| Volume Percentages: | |
| Water | 56.76. |
| Control rods | 3.97. |
| Helium gap | 0.64. |
| Fuel | 24.55. |
| Stainless steel | 14.08. |
| Reactor power | 74 mw. |
| Operating pressure | 1750 p.s.i.a. |
| Total reactor flow rate | $8.0 \times 10^6$ lb./hr. |
| Reactor flow rate (second pass) | $7.6 \times 10^6$ lb./hr. |
| Reactor flow rate (third pass) | $6.8 \times 10^6$ lb./hr. |
| Reactor pressure drop (inlet nozzle to outlet nozzle) | 21 p.s.i |
| Velocity (nominal) (second pass) | 9.29 ft./sec. |
| Velocity (nominal) (third pass) | 8.40 ft./sec. |
| Percent leakage flow (second pass) | 5%. |
| Percent leakage flow (third pass) | 10%. |
| Percent total leakage flow | 15%. |
| Number of passes through core | 2. |
| Bulk coolant inlet temperature at full power | 494.7 F. |
| Bulk coolant outlet temperature at full power | 521.3 F. |
| Average reactor temperature at full power | 508 F. |
| Coolant outlet temperature: Nominal channel (third pass) | 536 F. |
| Maximum surface temperature: Nominal channel (third pass) | 610 F. |
| Saturation temperature at 1750 p.s.i.a. | 617 F. |
| Maximum fuel pin internal temperature: Nominal channel | 3976 F. |

Obviously many modifications and variations of the present invention are possible in the light of the above teachings. It is, therefore, to be understood that within the scope of the appended claims the invention may be practiced otherwise than as specifically described.

We claim:

1. A nuclear reactor comprising a sealed pressure vessel, an active core of a plurality of vertically extended fuel assemblies spaced from and parallel to each other containing thermal-neutron-fissionable material, each of said assemblies having longitudinal passages therethrough for permitting flow of moderator fluid, first and second baffle assemblies arranged opposite the top and bottom ends, respectively, of said active core, said first baffle assembly including means for directing moderating fluid into the longitudinal passages of the outer portion of said fuel assemblies forming a downward second pass of said fluid through said reactor, said second baffle assembly including means for directing egressing moderating fluid from said outer portion of said fuel assemblies into the remaining inner portion of said fuel assemblies and the spaces therebetween forming an upward third pass of said fluid through said reactor, an inlet to said pressure vessel adjacent said second baffle assembly, means for directing moderating fluid entering said pressure vessel along the outside of said core into said first baffle assembly forming an upward first pass of said fluid through said reactor, an outlet from said pressure vessel adjacent said first baffle assembly for directing egressing third pass moderating fluid flow to the outside of said pressure vessel, and supporting means connected to the inside wall of said vessel for suspending said core from an annular flange on said first baffle assembly, said supporting means also separating said first pass fluid from said third pass fluid.

2. A nuclear reactor comprising a sealed pressure vessel having a top closure, an active core of a plurality of vertically extended fuel assemblies spaced from and parallel to each other containing thermal-neutron-fissionable material, each of said assemblies having longitudinal passages therethrough for permitting flow of moderator fluid, first and second baffle assemblies arranged opposite the top and bottom ends, respectively, of said active core, said first baffle assembly including means for directing moderating fluid into the longitudinal passages of the outer portion of said fuel assemblies forming a downward second pass of said fluid through said reactor, said second baffle assembly including means for directing egressing moderating fluid from said outer portion of said fuel assemblies into the remaining inner portion of said fuel assemblies and the spaces therebetween forming an upward third pass of said fluid through said reactor, an inlet to said pressure vessel adjacent said second baffle assembly, means for directing moderating fluid entering said pressure vessel along the outside of said core into said first baffle assembly forming an upward first pass of said fluid through said reactor, an outlet from said pressure vessel adjacent said first baffle assembly for directing egressing third pass moderating fluid flow to the outside of said pressure vessel, supporting means connected to the inside wall of said vessel for suspending said core from an annular flange on said first baffle assembly, said supporting means also separating said first pass fluid from said third pass fluid, and means connected to said closure for transmitting hold-down forces to said core.

3. A nuclear reactor comprising a sealed pressure vessel having a top closure, an active core of a plurality of vertically extended fuel assemblies spaced from and parallel to each other containing thermal-neutron-fissionable material, each of said assemblies having longitudinal passages therethrough for permitting flow of moderator fluid, first and second baffle assemblies arranged opposite the top and bottom ends, respectively, of said active core, said first baffle assembly including means for directing moderating fluid into the longitudinal passages of the outer portion of said fuel assemblies forming a downward second pass of said fluid through said reactor, said second baffle assembly including means for directing egressing moderating fluid from said outer portion of said fuel assemblies into the remaining inner portion of said fuel assemblies and the spaces therebetween forming an upward third pass of said fluid through said reactor, an inlet to said pressure vessel adjacent said second baffle assembly, means for directing moderating fluid entering said pressure vessel along the outside of said core into said first baffle assembly forming an upward first pass of said fluid through said reactor, an outlet from said pressure vessel adjacent said first baffle assembly for directing egressing third pass moderating fluid flow to the outside of said pressure vessel, supporting means connected to the inside wall of said vessel for suspending said core from an annular flange on said first baffle assembly, said supporting means also separating said first pass fluid from said third pass fluid, and means connected between said closure and said first baffle assembly for transmitting hold-down forces to said core, and resisting side faces on said core due to change of flow direction of egressing third pass fluid from said first baffle assembly.

4. A nuclear reactor comprising a sealed pressure vessel, an active core of a plurality of vertically extended fuel assemblies spaced from and parallel to each other containing thermal-neutron-fissionable material, each of said assemblies having longitudinal passages therethrough for permitting flow of moderator fluid, upper and lower grid plates clamping the ends of said assemblies therebetween forming a rigid core structure and provided with openings for fluid flow and control rods therethrough, means between the tops of said fuel assemblies and said upper grid plate for absorbing hydraulic shock due to flow of said moderating fluid, first and second baffle assemblies arranged opposite said upper and lower grid plates, respectively, said first baffle assembly including means for directing moderating fluid into the longitudinal passages of the outer portion of said fuel assemblies forming a downward second pass of said fluid through said reactor, said second baffle assembly including means for directing egressing moderating fluid from said outer portion of said fuel assemblies into the remaining inner portion of said fuel assemblies and the spaces therebetween forming an upward third pass of said fluid through said reactor, an inlet to said pressure vessel adjacent said second baffle assembly, means for directing moderating fluid entering said pressure vessel along the outside of said core into said first baffle assembly forming an upward first pass of said fluid through said reactor, an outlet from said pressure vessel adjacent said first baffle assembly for directing egressing third pass moderating fluid flow to the outside of said pressure vessel, and supporting means connected to the inside wall of said vessel for suspending said core from an annular flange on said first baffle assembly, said supporting means also separating said first pass fluid from said third pass fluid.

5. A nuclear reactor comprising a sealed pressure vessel, a removable active core of a plurality of vertically extended fuel assemblies spaced from and parallel to each other containing thermal-neutron-fissionable material, each of said assemblies having longitudinal passages therethrough for permitting flow of moderator fluid, first and second baffle assemblies arranged opposite the top and bottom ends, respectively, of said active core, said first baffle assembly including means for directing moderating fluid into the longitudinal passages of the outer portion of said fuel assemblies forming a downward second pass of said fluid through said reactor, a lower plenum formed by said pressure vessel below said second baffle assembly, said second baffle assembly including means for directing egressing moderating fluid from said outer portion of said fuel assemblies into said lower plenum and thence into the remaining inner portion of said fuel assemblies and the spaces therebetween forming an upward third pass of said fluid through said reactor, an inlet to said pressure vessel adjacent said second baffle assembly, means including thermal shielding for directing moderating fluid entering said pressure vessel along the outside of said core into said first baffle assembly forming an upward first pass of said fluid through said reactor, said thermal shielding also enclosing said plenum and separating first pass fluid from egressing second pass fluid, an outlet from said pressure vessel adjacent said first baffle assembly for directing egressing third pass moderating fluid flow to the outside of said pressure vessel, and supporting means connected to the inside wall of said vessel for suspending said core from an annular flange on said first baffle assembly, said supporting means also separating said first pass fluid from egressing third pass fluid.

6. A pressurized nuclear reactor comprising a sealed pressure vessel having a top closure, an active core of a plurality of vertically extended fuel assemblies spaced from and parallel to each other containing thermal-neutron-fissionable enriched uranium material, each of said assemblies having longitudinal passages therethrough for permitting flow of moderating light water fluid, first and second baffle assemblies arranged opposite the top and bottom ends, respectively, of said active core, said first baffle assembly including means for directing moderating fluid into the longitudinal passages of the outer portion of said fuel assemblies forming a downward second pass of said fluid through said reactor, said second baffle assembly including means for directing egressing moderating fluid from said outer portion of said fuel assemblies into the remaining inner portion of said fuel assemblies and the spaces therebetween forming an upward third pass of said fluid through said reactor, an inlet to said pressure vessel adjacent said second baffle assembly, means including thermal shielding for directing moderating fluid entering said pressure vessel along the outside of said core into said first baffle assembly forming an upward first pass of said fluid through said reactor, an outlet from said pressure vessel adjacent said first baffle assembly for directing egressing third pass moderating fluid flow to the outside of said pressure vessel, supporting means connected to the inside wall of said vessel for suspending said core from an annular flange on said first baffle assembly, said supporting means also separating said first pass fluid from said third pass fluid, means connected to said closure for transmitting hold-down forces to said core, and a plurality of adjustable control rods extending through said closure down into the spaces between said fuel assemblies.

References Cited in the file of this patent

UNITED STATES PATENTS 2,848,404    Treshow   ---------------- Aug. 19, 1958

FOREIGN PATENTS 1,039,659    Germany --------------- Sept. 25, 1958

OTHER REFERENCES

Energia Nucleare, vol. 4, No. 6, December 1957, pp. 447–466, particularly pp. 458–459. The remainder of the pages are cited as pertinent.